United States Patent
Cross et al.

(10) Patent No.: US 6,570,762 B2
(45) Date of Patent: May 27, 2003

(54) TELECOMMUNICATIONS SYSTEM

(75) Inventors: Douglas B. Cross, Ottawa (CA); John C. Atkinson, Ottawa (CA); Marko Nicolici, Ottawa (CA); Kalvin W. Korpela, Ottawa (CA); Roger D. Carroll, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/935,586

(22) Filed: Aug. 24, 2001

(65) Prior Publication Data

US 2002/0051532 A1 May 2, 2002

(30) Foreign Application Priority Data

Aug. 24, 2000 (CA) ............................................. 2316745

(51) Int. Cl.[7] ................................................. H05K 7/20
(52) U.S. Cl. ...................... 361/695; 361/676; 454/184; 455/348
(58) Field of Search .......................... 455/66, 347, 348, 455/349; 312/223.1, 236; 454/184; 165/80.3, 121–126; 361/676, 690, 694, 695, 697, 719, 724–727, 683, 686

(56) References Cited

U.S. PATENT DOCUMENTS

| | | | | |
|---|---|---|---|---|
| 5,477,416 A | * | 12/1995 | Schkrohowsky et al. | 361/695 |
| 5,546,273 A | * | 8/1996 | Harris | 361/697 |
| 5,781,410 A | * | 7/1998 | Keown et al. | 361/690 |
| 6,052,281 A | * | 4/2000 | Hardt et al. | 361/690 |
| 6,166,919 A | * | 12/2000 | Nicolici et al. | 361/800 |
| 6,175,490 B1 | * | 1/2001 | Papa | |
| 6,186,889 B1 | * | 2/2001 | Byrne | 454/184 |
| 6,310,783 B1 | * | 10/2001 | Winch et al. | 361/797 |

* cited by examiner

Primary Examiner—Gerald Tolin

(57) ABSTRACT

The invention refers to a telecommunications system comprising a module rack that defines a core bay, a service plane and a rack interface plane where the service plane is transverse to the rack interface plane. The core bay is in part bounded by the service plane and the rack interface plane. The telecommunications system also comprises a series of electronics modules each defining an electronics orientation plane where each of the modules includes two opposed cooling surfaces oriented substantially parallel to the electronics orientation plane. Each of the electronics modules is removably secured within the core bay. The series of the electronics modules forms an array such that their electronics orientation planes are substantially perpendicular to both the rack interface plane and the service plane. The array also defines at least one coolant stream passage across each cooling surface. Further the telecommunications system includes a coolant movement means for moving a coolant through the coolant stream passages and across the rack interface plane. As such, the coolant convects heat away from the cooling surfaces of electronics modules more efficiently and effectively than found in the prior art as it, amongst other things, shortens the distance over which the inlet coolant is required to travel to cool the same functional density and provides a coolant to the passage at approximately a uniform temperature for each module.

39 Claims, 8 Drawing Sheets

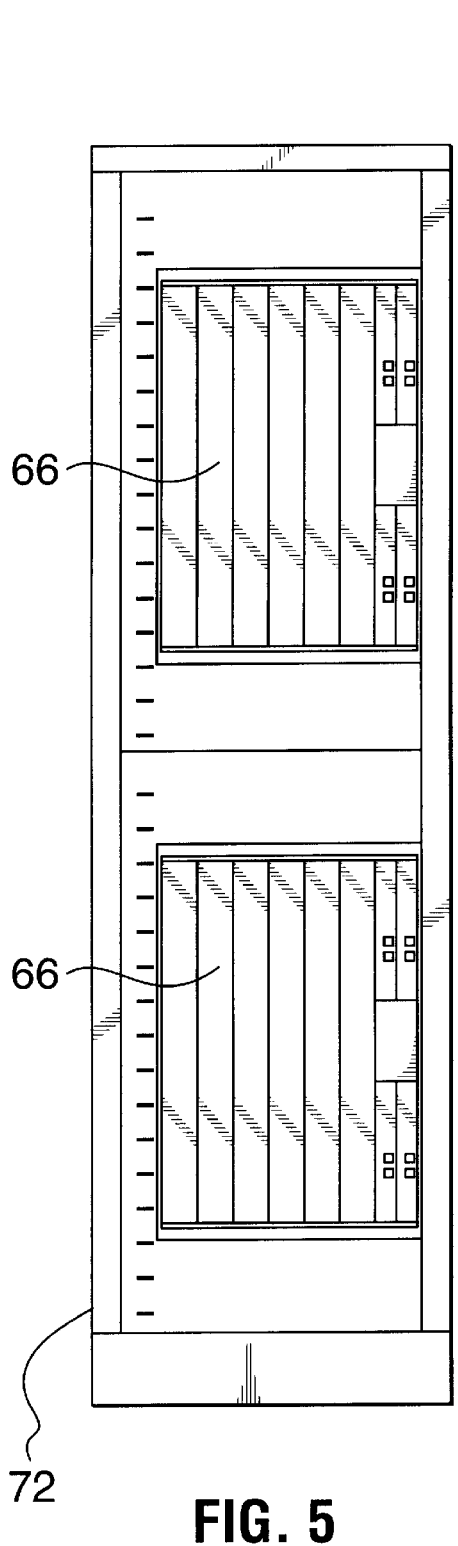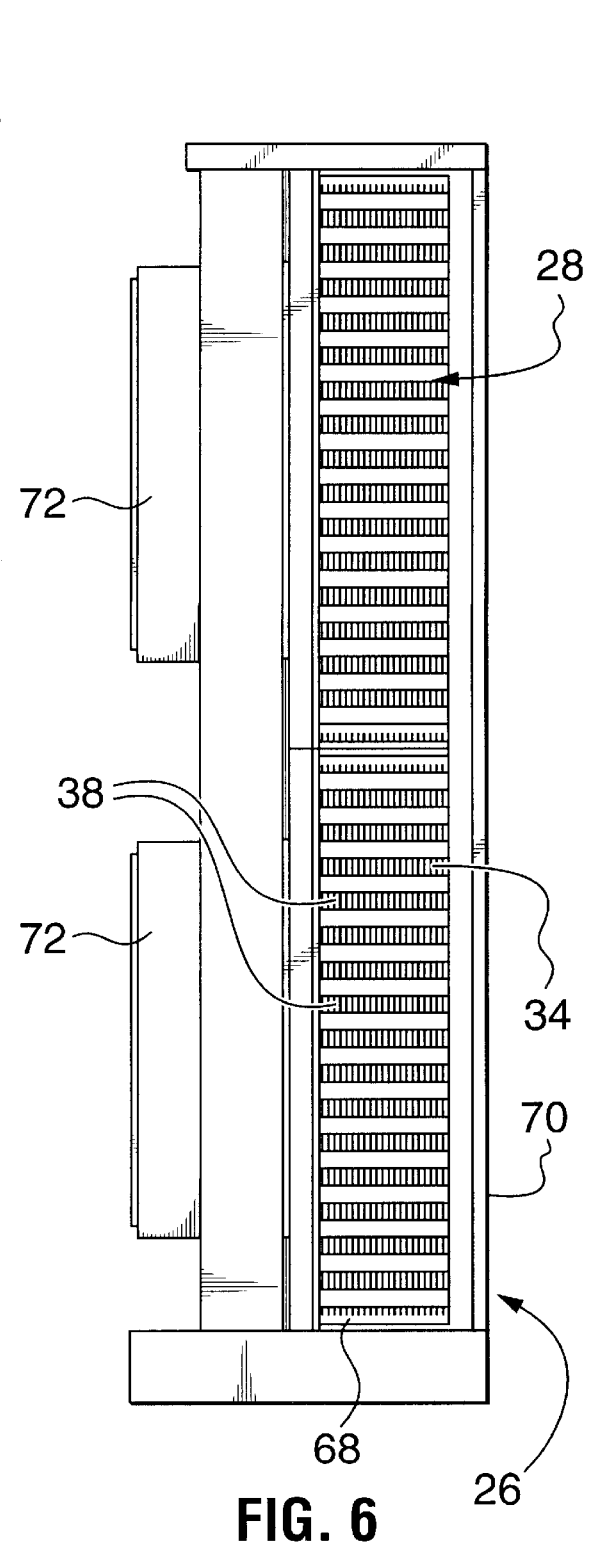
FIG. 5  FIG. 6

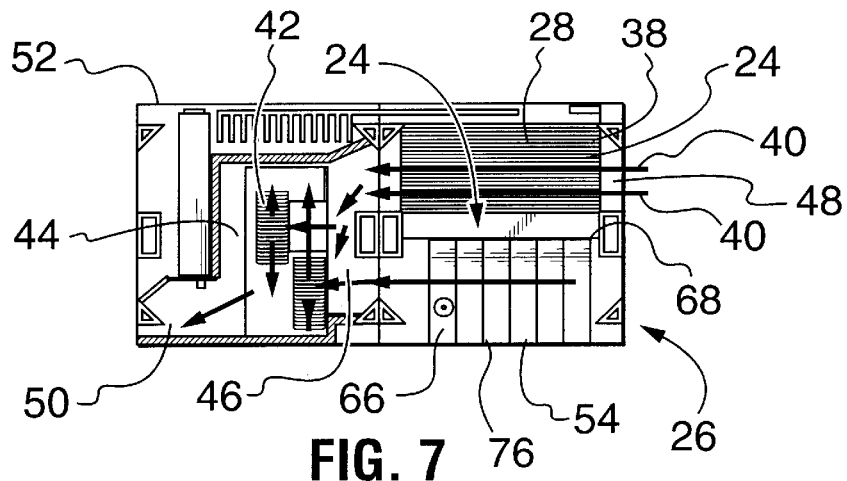
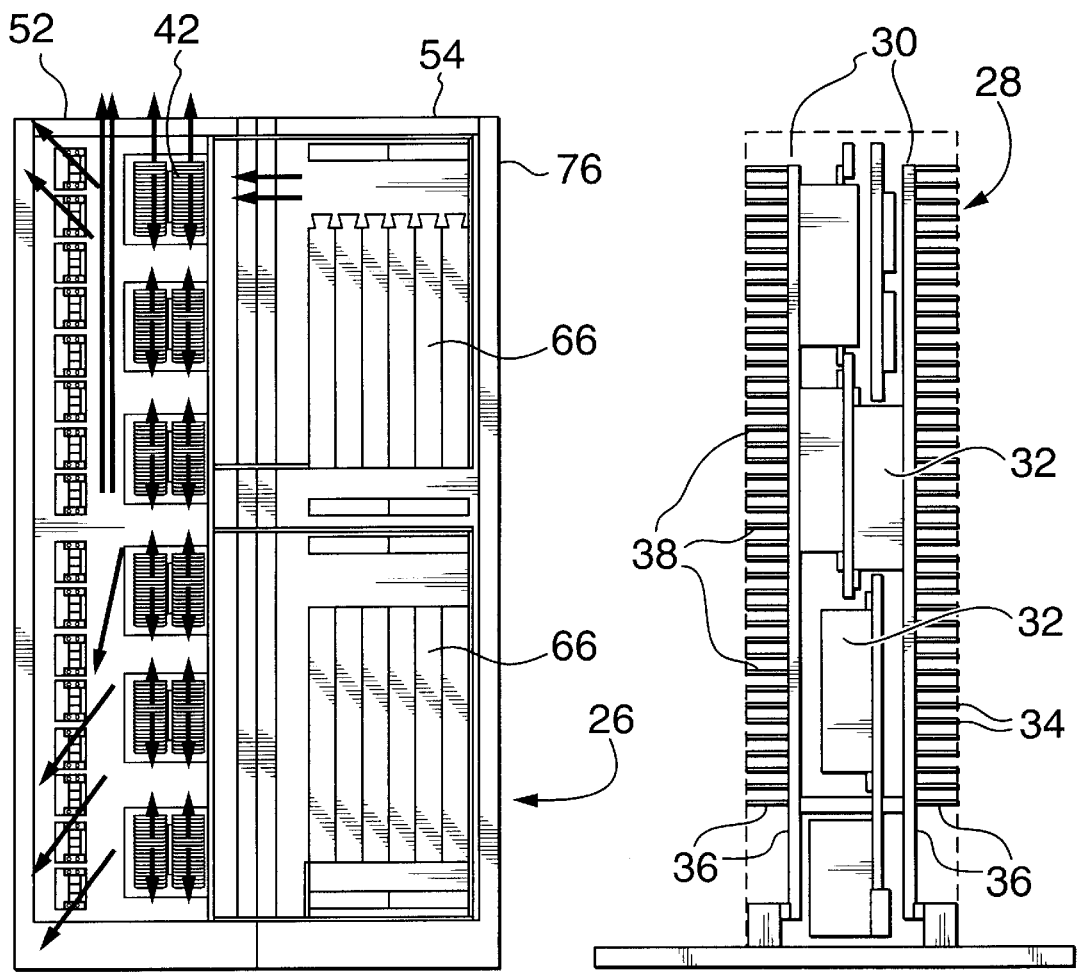

TELECOMMUNICATIONS SYSTEM

FIELD OF THE INVENTION

The invention relates to a telecommunications system.

BACKGROUND OF THE INVENTION

In the digital communications, telecommunications and data processing industries, equipment racks are used to house and organize modules, each of which are used to manage incoming and outgoing and telecommunications and digital data as well as computer generated data. Collectively, the equipment racks along with the housed equipment are known as telecommunications systems. Generally, these telecommunications systems are found as a series of adjacent systems warehoused in service facilities. As such, the objective is to compact as much processing or functional capability within as small a space as possible. Ultimately, costs increase as the volume required to house a given amount of data processing functionality increases. Moreover, any increase in the distance required to transmit telecommunications or other data signals will result in a corresponding decrease in the bandwidth available to those signals. In other words, an objective in the telecommunications, digital communications and data processing industries is to secure an ever higher functional density.

Each telecommunications system is made up of a rack outlining a core bay into which a number of data processing modules are supported. While there exists different modules for different functional objectives, each module generally consists of a circuit board encased in a protective housing. The circuit board processes telecommunications data and other digital or computer data. As these circuit boards require power to operate, they ultimately convert some of that energy supplied into heat. However, the circuit boards must be kept within a certain temperature range to operate properly and, as such, an important consideration in telecommunications systems has been the ability to manage heat generated by these circuit boards in operation.

While heat generation in a telecommunications system was always an important factor considered in designing such systems, historically, in general it has tended to be the case, that the limiting factor in regards to functional density has been the ability in compact a desired density of data pressing electronics into a given space as opposed to the management of heat generated by the electronic in question. That is, it has tended to be the case that heat generation as a function of processing capability per unit volume was not historically a functional limiting concern.

Originally, heat generation was managed by simply orienting modules generally in a vertical column such that air heated by the modules could easily rise between modules convecting heat up and away from the telecommunications systems. This decision directed the industry standard that has defined the gross architecture of these systems. As technology has progressed, heat management has had to be facilitated by a forced air system wherein air was directed through vertical columns between vertically oriented modules and away from the telecommunications system.

In recent years, however, there has consistently been a the dramatic increase in functional density in regards to the reduction in space required for an amount of data process capability. At the same time, the power required to operate each module and the consequent heat generated has correspondingly increased in nearly as dramatic a fashion to the point where traditional vertically oriented or end-on-end oriented eletronics modules within a telecommunications systems have been or will soon be unable to realize the advantages of the functional densities now achievable. That is, given the current scale of the racks used, namely on the order of 7 feet in height, it has become difficult to maintain module temperatures within the required range using forced air cooling methods while the modules are vertically oriented along the height of the racks in an end-on-end series of columns. While alternatives have been proposed to better manage heat through such vertical columns of modules, these alternatives suffer significant drawbacks. For example, one alternative proposes the introduction of multiple air or coolant inlets and outlet along the length of the column. Unfortunately, it is very difficult to avoid co-mingling of heated coolant that has convected some heat away from downstream modules with introduced coolant at ambient or chilled temperatures. As such, the introduced coolant must serve the dual purpose of cooling already warmed coolant as well as further upstream modules.

A further alternative in the prior art proposes directing coolant across the service plane or front face of the telecommunications system, cooling the modules and exhausting the heated coolant out of the system through the rear plane of the system. This method of cooling, however, requires exhaust outlets through the backplane or midplane into which the electronics modules are removably secured and through which the electronics modules may receive or transmit data. The inclusion of such exhaust outlets in the backplane or midplane naturally uses up space that might otherwise be used for electronic circuitry or components thereby limiting the functional density of the system as a whole.

Ultimately, functionality for a given module and therefore for telecommunications systems has been or is soon expected to be limited by the ability of network or data processing providers to maintain each module within a required operating temperature range.

Further, vertical orientation of modules has resulted in a need to arrange what has become the industry standard for transporting telecommunications, digital communications or computer generated data into modules, namely, fibre optic cables, in such a way that they must be directed through at least two bend points in order to he routed away from a given telecommunications system to a cable management facility. This was not much of an issue, historically, when the space required for a set of electronic components to process a given amount of data was relatively larger than it is today and, as a result, the relative number of data transports into a module was small. However, with the ever increasing density of electronic functionality within a given volume resulting in the ability to handle ever increasing volumes of data, the number of transports or fibre-optic cables into a given telecommunications system has increased. As such, cable management in the telecommunications system has become cumbersome given the multi-bend routing required to direct cables out of the telecommunications system into a cable management facility.

Also, the bundling found in these prior art vertically oriented systems requires cabling from a given set of modules to be co-bundled in some cases before being transported out of the telecommunications system to a cable management facility. Cable maintenance often involved the tedious process of finding and separating specific cables or even fibres associated with a given modules out a bundle of multiple cable from various modules, all of which often had to be done remotely from the telecommunications system.

Also, telecommunications systems generally include electronics modules that dominate the signal processing in a telecommunications system, and switch modules, used to provide a method of communicating between electronics modules. In the telecommunications industry these electronics modules are known, for many applications, as access modules. As inferred above, traditional vertical electronics module orientation required an interface between the electronics and switch modules which included, for peripheral electronics modules, longer signal transports than needed for electronics modules that happened to line-up adjacent to a given switch module. The peripheral signal transports suffered reduced bandwidths, and, as such, reduced functionality.

The present invention deals with the problems noted above. In short it allows for the main processing modules or electronics modules to be reconnected to deal with these problem. Moreover, in an embodiment of the invention the basic general architecture that defines industry standard core bays in the digital communications and telecommunications industries may be utilized allowing an ease of conversion from telecommunications systems currently found in the telecommunications and digital communications industries.

Such reorientation of the electronics modules allows for a means of significantly improving heat management of electronics modules, cable management within a telecommunications system and data transfer between switch and electronics modules.

According to one aspect of the invention, there is provided a telecommunications system. The telecommunications system comprises: (a) a module rack providing a core bay and defining a service plane and a rack interface plane, wherein the service plane is transverse to the rack interface plane and the core bay is in part bounded by the service plane and the rack interface plane; (b) a series of electronics modules each defining an electronics orientation plane, each of the electronics modules including two opposed cooling surfaces oriented substantially parallel to the electronics orientation plane, each electronics module being removably secured within the core bay, the series of electronics modules forming an array such that their electronics orientation planes are substantially perpendicular to both the rack interface plane and the service plane, the array defining a plurality of coolant stream passages extending across the cooling surfaces defined by said electronics modules, the coolant stream passages being implemented by and between adjacent modules of the array, with the coolant stream passages thus defined being parallel to one another and transverse to the rack interface plane and providing uniform cooling capacity; and (c) a coolant mover for moving a coolant through the coolant stream passages and across the rack interface plane thus convecting heat away from the cooling surfaces of the electronics modules.

BRIEF DESCRIPTION OF THE INVENTION

A preferred embodiment of the invention is a telecommunications system comprising a module rack that defines a core bay, a service plane and a rack interface plane where the service plane is transverse to the rack interface plane. The core bay is in part bounded by the service plane and the rack interface plane. A second component of this preferred embodiment is a series of electronics modules each defining an electronics orientation plane where each of the modules includes two opposed cooling surfaces oriented substantially parallel to the electronics orientation plane. Each of the electronics modules is removably secured within the core bay. The series of the electronics modules forms an array such that their electronics orientation planes are substantially perpendicular to both the rack interface plane and the service plane. The array also defines at least one coolant stream passage across each cooling surface, with the coolant stream passages running parallel to one another and transverse to the rack interface plane. The third component of this embodiment of the telecommunications system is a coolant movement means for moving a coolant through the coolant stream passages and across the rack interface plane. As such, the coolant convects heat away from the cooling surfaces of electronics modules. This embodiment provides a more efficient and effective means of moving heat from the electronics modules than found in the prior art as it, amongst other things, shortens the distance over which the inlet coolant is required to travel to cool the same functional capacity.

A further embodiment of the telecommunications system orients the modules horizontally thus utilizing the industry standard for core bays found in the digital communications and telecommunications industries. As such, conversion to telecommunications systems as taught, should be relatively straightforward and inexpensive. Moreover, the utilization of the basic architecture of telecommunications systems currently being used will help to facilitate future upgrades in regards to the cooling system utilized. By placing an adjunct bay facilitating the cooling means immediately proximate the core bay, as taught in one embodiment of the invention, it will be easier to remove and upgrade these cooling bays. Finally, utilizing this architecture also provides for a easier method of routing fibre optics cables away from the core bay and electronics module to a cable management facility.

A further embodiment of the telecommunications system ensures that the coolant provided to the modules is of substantially equal temperature entering the coolant stream passages.

A further embodiment of the telecommunications system provides for a adjunct bay adjacent to the core bay to house the coolant movement means. As such, each telecommunications system is accompanied by an independent coolant means that is easily serviced and easily upgradeable and provides greater redundancy to the cooling system that a central unit may lack.

A further embodiment of the telecommunications system provides for an air mover as the coolant movement means.

A further embodiment of the telecommunications system provides additionally for a midplane structure that defines a frontal and rear face where the midplane structure is secured in the core bay such that the frontal face is oriented towards and is parallel to the service plane. It further includes at least one switch module where the switch module is secured in the core bay transverse to the electronics orientation planes defined by the electronics module. The switch module is also parallel to the interface plane. The switch module is, moreover, in communication with the electronics modules through the midplane structure. This allows for the switch modules to be placed adjacent to a series of electronics modules across the midplane structure, thereby, increasing the overall bandwidth available between the switch and electronics modules.

A further embodiment of the telecommunications system further includes a cable transport abutting the module rack where the cable transport is adapted to direct a series of data carrying cables from the electronics modules to a cable management facility.

Still a further embodiment of the telecommunications system allows for a slack storage unit positioned between the cable transport and module rack that includes a series of rows corresponding to each of the electronics modules. The series of rows extend from the module rack to the cable transport and house bundles of cable and a service area for cables. The slack storage unit directs the cables from the electronics modules through to the cable transports, where the cable transport directs the cable to a cable management facility.

A further embodiment of the telecommunications system includes a telecommunications system that comprises the module rack and electronics modules considered in the first embodiment but includes a coolant movement means that moves a coolant through the coolant stream passages and across the rack interface plane thus convecting heat away from the cooling surfaces and the electronics modules. This embodiment allows for alternatives to air cooling for the modules and, with a further inclusion of the adjunct bay, a place to house the coolant movement system.

DETAILED DESCRIPTION OF THE DRAWINGS

FIG. 5 is a back schematic view of a preferred embodiment of a telecommunications system.

FIG. 6 is a side schematic view of a preferred embodiment of a telecommunications system along the line of A—A of FIG. 4.

FIG. 7 is a top schematic view of a preferred embodiment of a telecommunications system along the line of B—B of FIG. 4.

FIG. 8 is a back cross sectional view of a preferred embodiment of a telecommunications system along the line C—C of FIG. 6.

FIG. 9 is a cross-sectional view of an electronics module.

DETAILED DESCRIPTION

Figure 1:
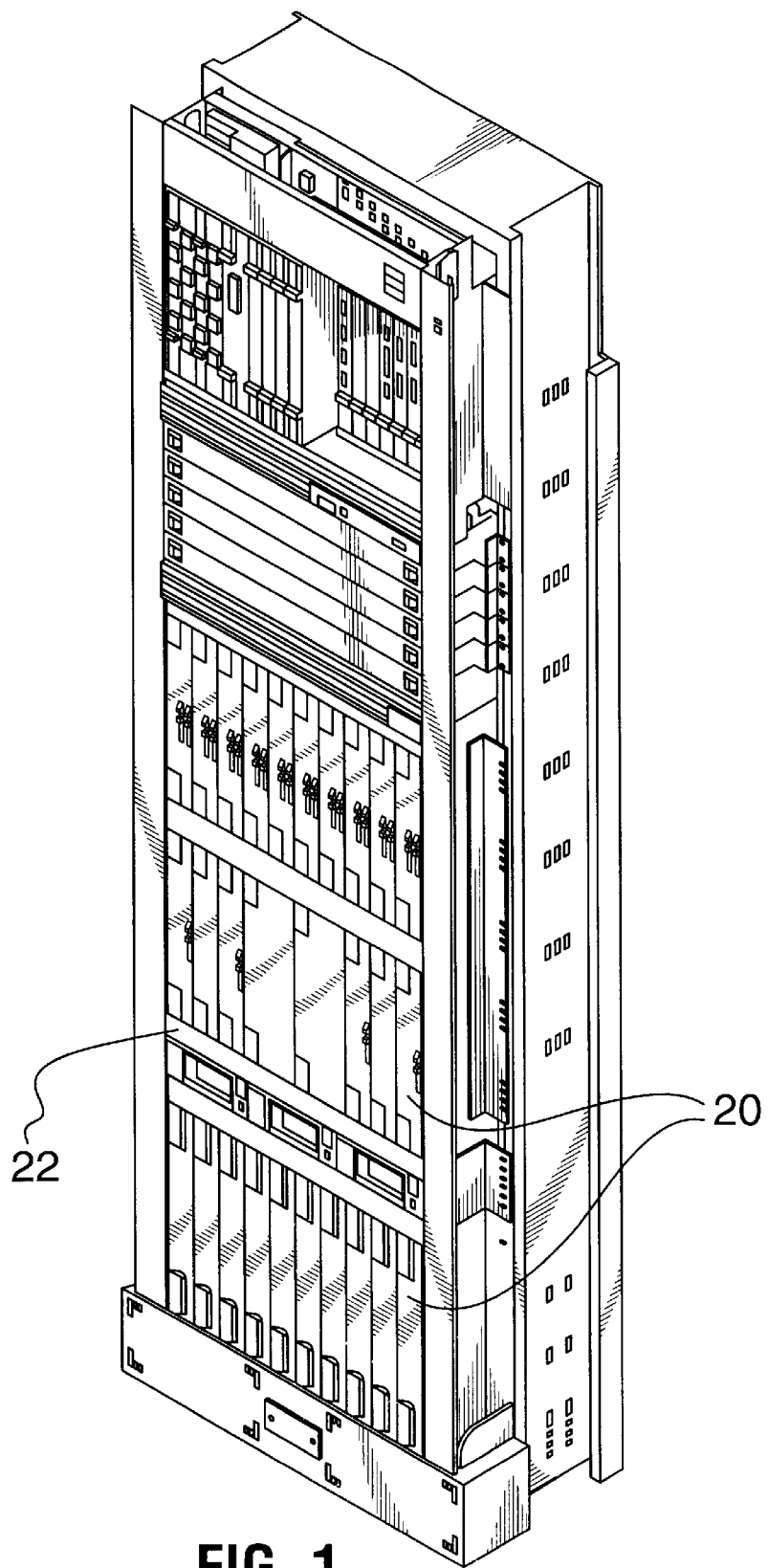
FIG. 1 is a perspective view of the prior art telecommunications systems.

Referring to FIG. 1, the telecommunications system found in the prior art shows vertically oriented electronics modules 20 supported in a core bay 22. Generally, the dimensions of the core bay have evolved over the last decade from the need to utilize as much space within a service room as possible while maintaining workable dimensions and weight for the electronics modules such that service personnel could easily handle the modules.

Referring to FIGS. 2, 4, 6, 7 and 9, a preferred embodiment of the system is shown where, focussing on the core bay 24 of the telecommunications system 26, a series of the electronics modules 28 are aligned in the core bay 24 when the telecommunications system 26 is in its operational position. In the embodiment shown, although the invention is not limited to this configuration, 16 electronics modules 28 are stacked in a given core bay 24, where two core bays are shown, one stacked on top of the other.

The basic configuration described above utilizes the basic dimensions of the prior art telecommunications systems 26 found in digital communication and telecommunications industries. That is, the present invention teaches a telecommunications system 26 that can utilize the same basic facilities utilized to house these systems. While these physical dimension do not limit the invention, they do allow a ease of conversion to the telecommunications system taught, that would not otherwise exist.

Each module 28, as seen in FIGS. 7 and 9, has an encasing 30 adapted to conduct heat away from the internally housed electronic and optical devices 32. In a preferred embodiment as shown, the heat is conducted to extended surfaces or fins 34 on the cooling surface 36 to define a series of coolant stream passage 38 wherein a coolant such as an airstream 40 at ambient room temperature may be directed to convect heat away from the cooling surfaces 34. The cooling surfaces 36 or heatsinks can be constructed from an aluminum alloy housing, however, other suitable conducting material can also be used.

Moreover, alternate methods may be employed for convecting heat away from the electronics modules. For example, an alternate embodiment may include introducing a chilled airstream into the coolant stream passages 38. Also, the cooling surface may be a cold plate wherein a cooling medium is circulated.

Generally, again referring to FIG. 7, a coolant movement means directs a coolant over the cooling surfaces 36 or heatsinks. In the embodiment shown, the coolant movement means that forms part of the telecommunications system in a series of air movers 42 that are housed in a adjunct bay 44 situated adjacent to the core bay 24. The air movers 42 create a low pressure plenum 46 immediately adjacent to the core bay 24 and, as such, immediately adjacent the array of modules 28. Specifically, referring to FIG. 8, ambient air is directed from an inlet plenum 48 across the module cooling surfaces 36 through one or more coolant stream passages 38 into a low pressure plenum 46 created by the air movers 42. It is advantageous for the air to be introduced to each stream passage 38 at approximately the same temperature, thereby provided the same cooling capability across the stream passages 38 into the low-pressure plenum 46. The air movement system is a "pull" system. Air enters into the stream passages and across the cooling surfaces 36 of the electronics modules 24 and is drawn into the adjunct bay 44. The convecting air 40 or other suitable coolant is then expelled to an exhaust plenum 50 within the adjunct bay 44 convecting a portion of heat generated by the electronics modules 28 out of the telecommunications system 26.

By providing adjunct bay housing 52 and core bay housing 54 that is functionally integrated but physically separable, the mobility and interchangeability of these units of the preferred embodiment shown is enhanced.

In the embodiment shown, three air movers 42 are secured in each adjunct bay 44 and associated with each core bay 24.

Note that the coolant movement means is not limited to the embodiment shown. Other means of directing air or any other suitable coolant across the cooling surface of each module will also work. These might include a coolant movement system remote from the core bay that creates a low pressure plenum adjacent to the array of modules. Moreover, while the creation of a low pressure plenum downstream of the electronics modules helps to provide uniform convection of heat away from all the electronics modules, any other means of directing a coolant across the cooling surfaces or heatsinks of the electronics modules will also work. That might include the creation of a high-pressure plenum adjacent to the modules array "pushing" coolant across the heatsinks or cooling surfaces. Care, in this situation must be taken however, to ensure a relatively uniform distribution of coolant across all cooling surfaces.

Additionally, an alternate embodiment, wherein the cooling surfaces are cold plates as noted above, would provide for a means of circulating a cooling medium through the cold plates. The orientation of the electronics modules, however, would allow the circulating means to be secured in the adjunct bay adjacent to the module array. As such, the conduits required to transport the cooling medium could be directly routed to the circulation means. All electronics modules cooling surfaces would be easily accessible and to some degree equidistant from the circulating means. The same idea can also be utilized where the adjunct bay is removed and the means for circulating the coolant is housed remotely forcing coolant through the arrays in one or several telecommunications systems.

In the embodiment shown, and referring to FIGS. 7 and 9, the coolant stream passages are created from a series of cast fins 34 that provide passages 38 along the cooling surface 36 of each module, however, other suitable structures that allow air or another coolant medium to be relatively uniformly drawn across the conductive cooling surfaces 36 will also suffice.

While the cooling surface noted in the embodiment disclosed includes integral cast fins 34 and can dissipate on the order of 350W per electronics module utilizing ambient room air, this is not the only embodiment that will provide the required heat convection solution. An enhanced heatsink may also be used. Improved heat transfer performance can be achieved by decreasing the thickness of the fins and placing more of them on a tighter pitch. Fins can be interrupted and offset at intervals along their length to break up the boundary layer and optimize heat transfer.

In the embodiment of the invention noted above, air movement into the low-pressure plenum 46 other than through the coolant stream passages 38 as shown, should be minimized. As such, the system as a whole should demonstrate minimal loss through the core bay 24 or adjunct bay 44 in order to maximize the mass transport of air around the cast fins 34 and through the coolant stream passages 38 and, therefore, maximize the dissipation of heat away from the electronics modules 28. In the embodiment shown, leakage is controlled by applying environmental gaskets to seal cracks occurring due to loose tolerance fits or due to removable covers.

Note, where the coolant is air, as it is directed across a sealed module, no air filters are required.

Where the coolant used to convect heat away from the cooling surface is air, it should be noted that the degree of cooling provided will be reduced with increased altitude. This should be taken into account considering the location for installation of telecommunications systems utilizing those teachings.

Figure 2:
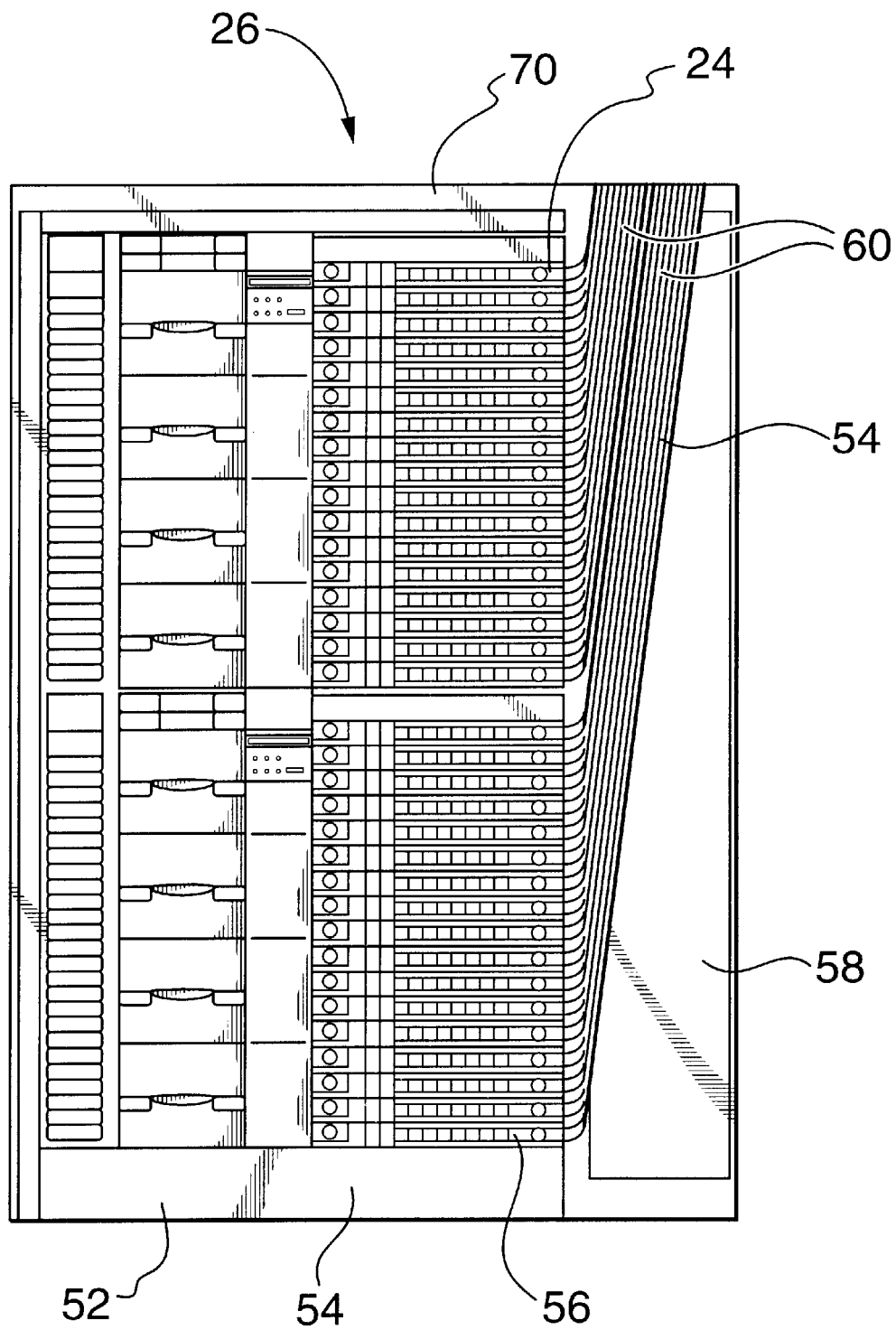
FIG. 2 is a front view of a preferred embodiment of a telecommunications system.
Figure 12:
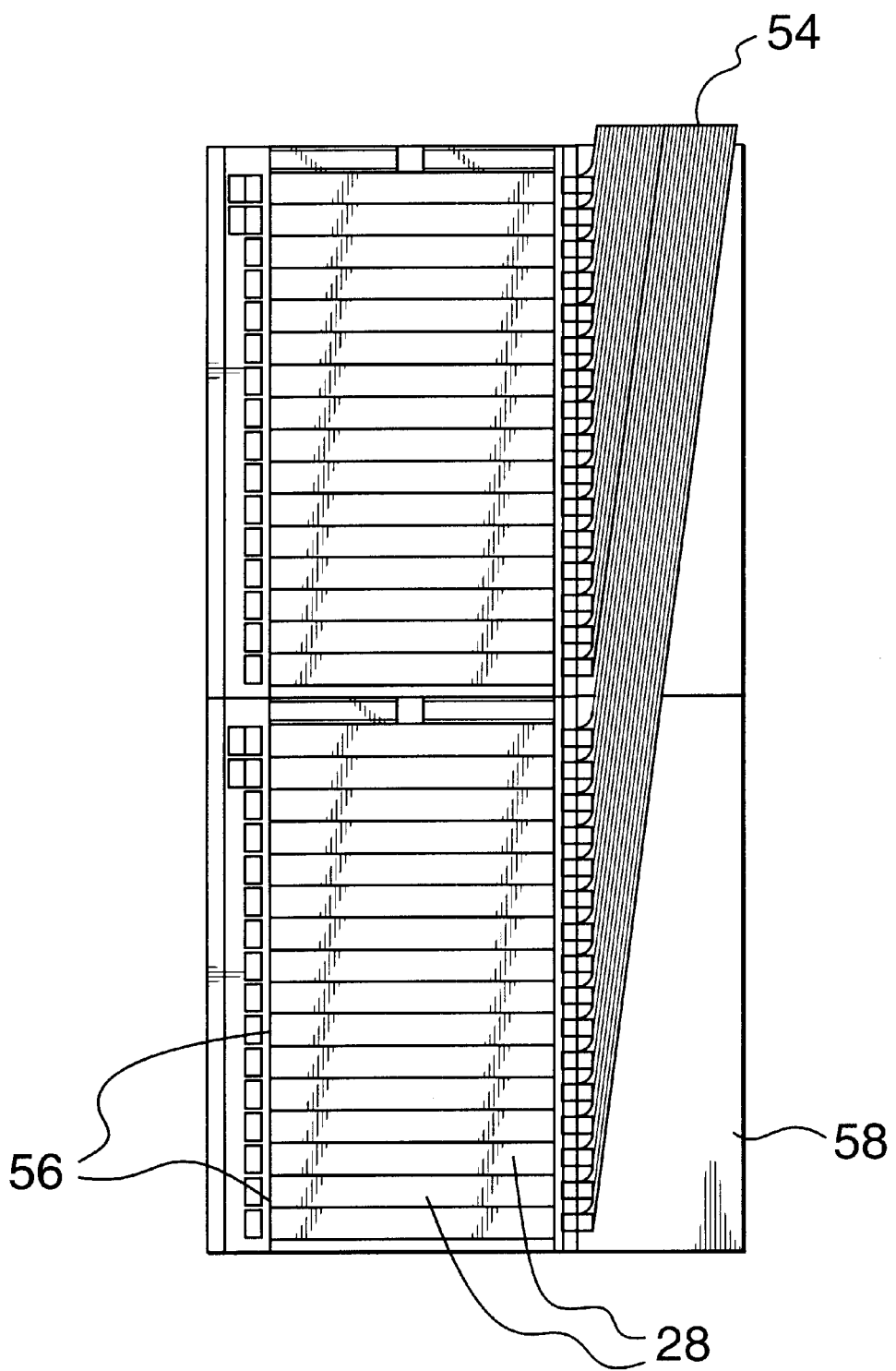
FIG. 12 is a front view of a telecommunications system including an alternative cable transport.

Referring to FIGS. 2 and 12, a further embodiment utilizes the advantages of the orientation of the eletronics modules where fibre optics cables 54 may be run from the face plates 56 of the electronics modules 28 and across the electronics modules 28 where they are directed through a cable transport 58 to a cable management facility. The cables 54 while in the embodiment shown are run upwards to a cable management facility, they may equally be directed downwards to a cable management facility.

Additionally, referring to FIG. 2, where the cable transport is utilized, a series of channels 60 may included wherein each of the cables 54 are directed from particular electronics module 28 through a channel corresponding with a given module.

Further, referring to FIG. 12, an embodiment is shown wherein the orientation of the electronics modules 28 allows for any cable 54 that may be associated with a given module to be routed into the cable transport 58 to bundle grouping facilities within the transport 58 that provide a means of bundling and grouping associated cabling prior to routing the cable to the cable management facility.

Figure 13:
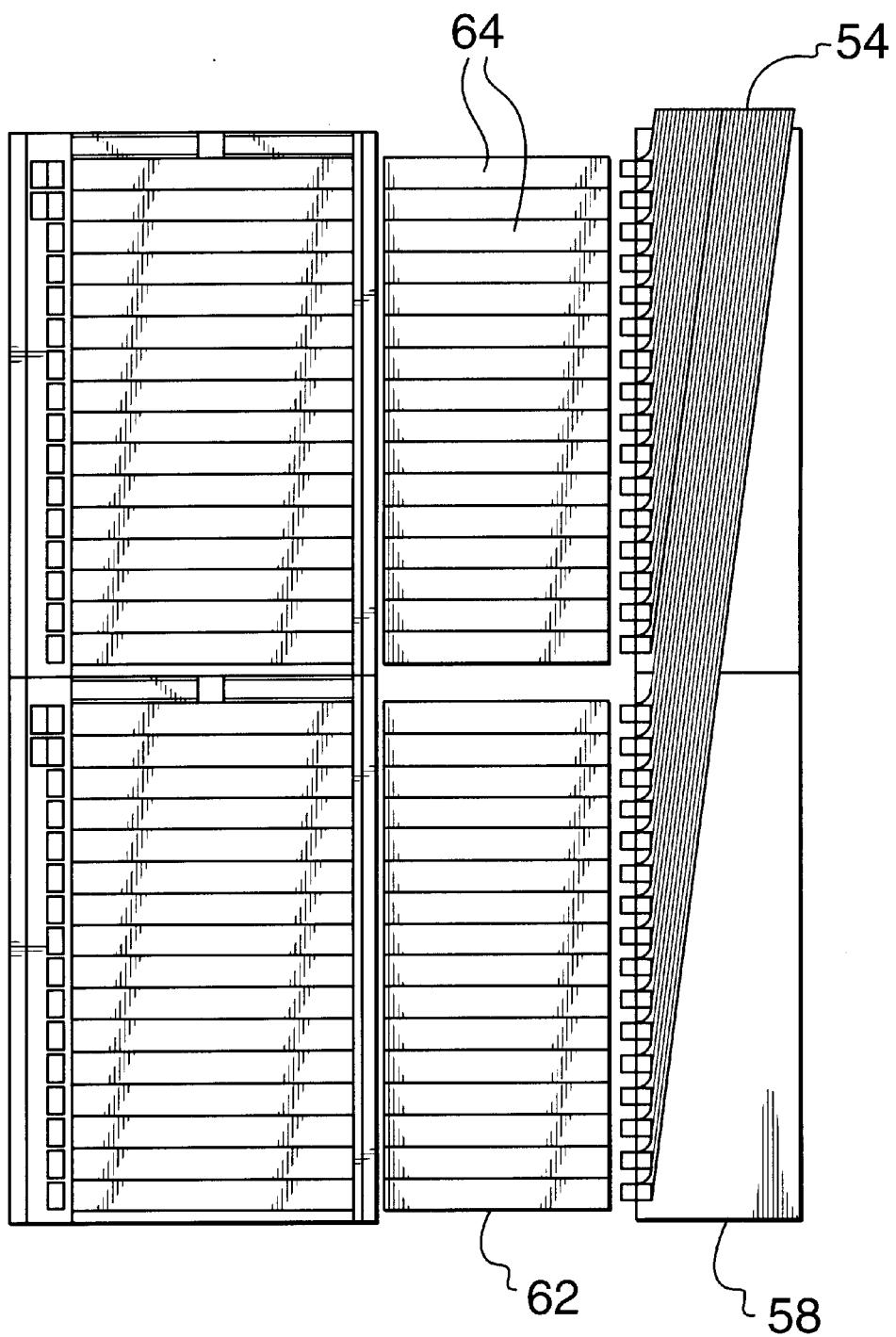
FIG. 13 is a front view of a telecommunications system including a slack storage facility and cable transport.

A further embodiment, referring to FIG. 13, shows how the orientation of the electronics modules allow for cabling to be routed through a slack storage unit 62 before being directed on to the cable transport 58. As such, cables 54 associated with a given module may be directed in to the slack storage unit 62 where excess cabling can be bundled or spooled. Also the slack storage unit 62 allows an area for service personnel to work with the cabling associated with a given module 28 including working with cable breakout. This also allows a work area and bundling area 64 near the termination point of the cables 54 that was not previously available.

Figure 4:
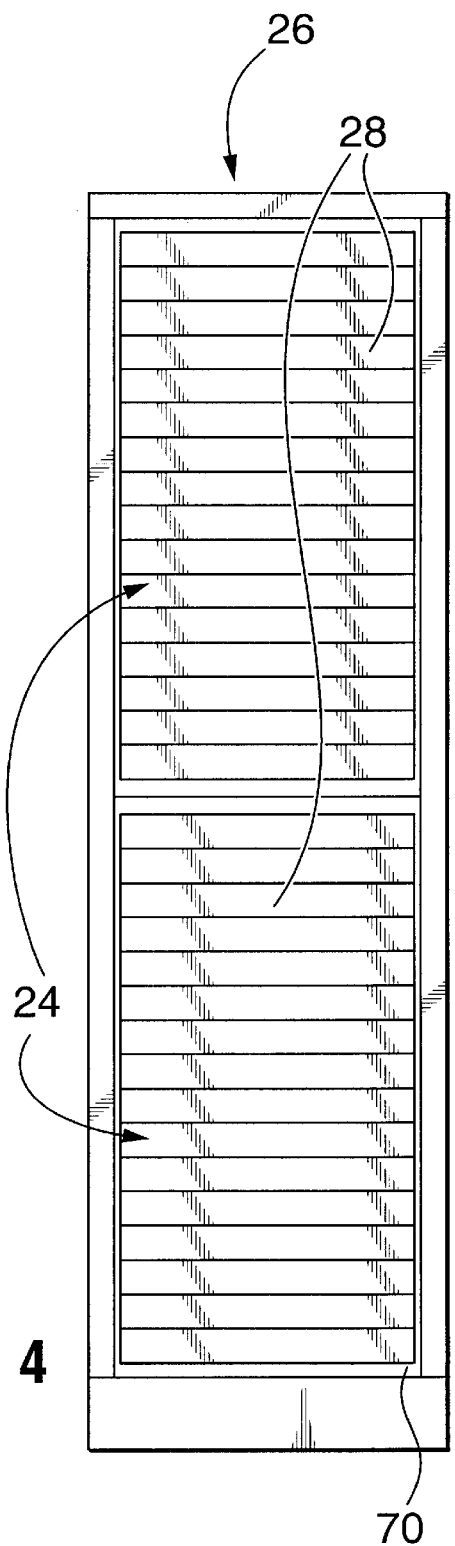
FIG. 4 is a front schematic view of a preferred embodiment of a telecommunications system.

The electronics modules 28 will generally be stacked in a vertical array where the modules will be oriented horizontally as noted in the FIGS. 2, 4 and 6. This is due to the practicalities that arise from such an orientation. That is, the telecommunications and digital communications industries have developed and defined telecommunications systems that generally conform to a vertically oriented core bay that is approximately 3 to 4 times higher than the core bay width or depth. As such, the advantages noted arise from being able to convert to systems that follow the teachings enclosed herein while maintaining the same gross dimensions of telecommunications systems found in the telecommunications and digital communications industries. As such, a generally vertical array of horizontally oriented electronics modules set in the core bay of these standard system structures meets this objective.

As such, reference to horizontal orientation of the electronics modules refer to embodiments directed at utilizing this existing infrastructure. That is, horizontal and vertical orientation references as used in this disclosure are in relation to a standing core bay wherein a vertical array of horizontally oriented electronics modules are placed. The invention, however, is not limited to a vertical array of electronics modules, all horizontally oriented. Some of advantages stated will, generally, be realized with a horizontal array of vertically oriented electronics modules, or any relative orientation in between, where coolant is directed over the cooling surfaces of the modules into a plenum situated proximate the array. While some of the advantages in regards to cable management, cooling efficiency and the ability to manipulate and upgrade the system may be lost, some of the heat management advantage may still enjoyed.

Figure 3:
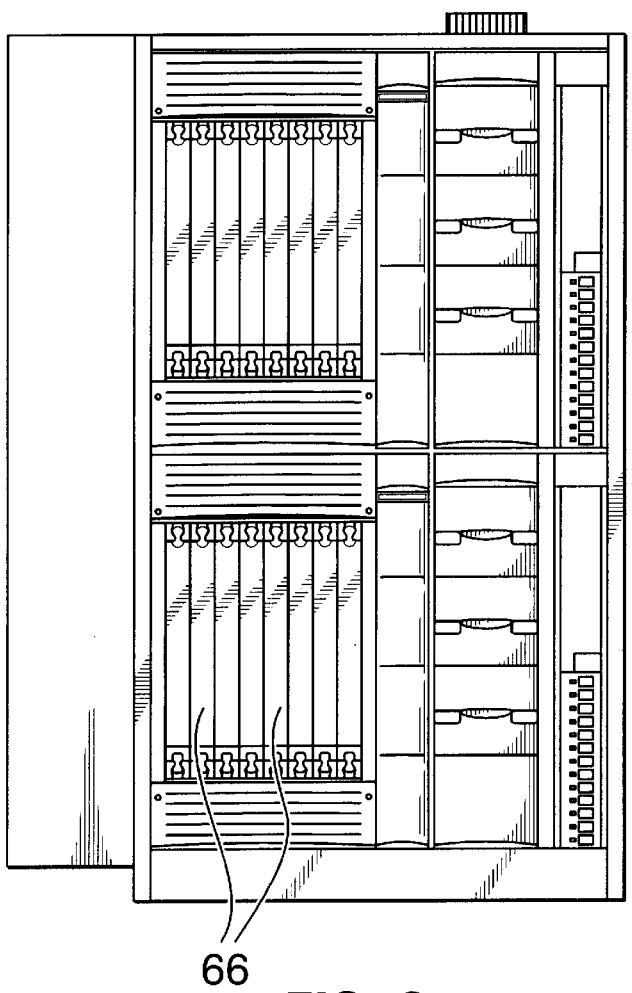
FIG. 3 is a rear view of a preferred embodiment of a telecommunications system.
Figure 11:
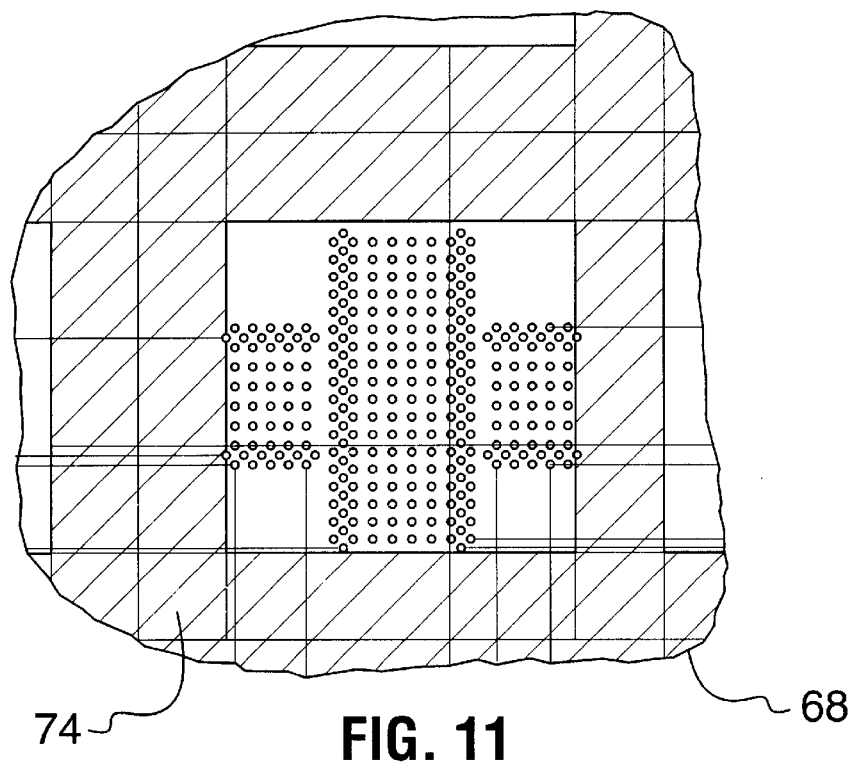
FIG. 11 is a top-cut view of the midplane at the module interconnection point.

Referring to FIGS. 3, 5 and 11, the present invention allows for advantages to be derived from the orientation taught of the electronics modules 28, wherein an embodiment of the telecommunications system 26 includes switch modules 66. In such an embodiment, one or a set of switch modules 66 may be secured within the core bay 24 behind the electronics modules 28. In such an embodiment a midplane 68, (a "midplane structure" that is a structure that is positioned around the mid plane of the core bay) is positioned and secured within the core bay 24 perpendicular to the electronics modules 28 and running across and adjacent the electronics modules 28. The electronics modules 28 should then be secured to the midplane 68 from the front face 70 of the telecommunications system. Behind the midplane 68 are one or more switch modules 66. In the embodiment shown, although not a limiting feature, six switch modules are included. These modules 68 are then oriented transverse to the orientation of the electronics modules 28. Communication between the electronics modules 28 and the switch modules 66 is then facilitated across the midplane 68. Given the orientation of the electronics modules 28 transverse to the switch modules 66, a cross-hatching configuration is created at the interface of the two sets of modules found on either side of the midplane 68. Therefore, the switch modules 66 are positioned within the core bay 24 such that they are proximate to each electronics modules 28 within a given array of such modules on the opposing side of the midplane 68 resulting in a relatively short interface between both sets of modules. As a result, the signal bandwidth across the midplane 68 is increased, on average.

As a result of the placement of the switch modules 66 towards to the back side of the telecommunications system 26, there may be a requirement to provide access to the back side 72 in such embodiment in order to allow service personnel access to these modules 66.

Considering the specific embodiment of the intersection points 74 on a midplane shown in FIG. 11, at each intersection point 74 between a given electronics module 28 and a given switch module 66, 40 pairs may be routed between the two modules: 20 Transmit and 20 Receive.

Moreover, referring to FIGS. 7 and 8, the coolant movement means 42 can be used to direct the coolant across coolant surfaces 76 found on the switch modules 66 thus convecting heat away from the switch modules 66. As the number of switch modules 66 is less than the electronics modules 29, the relatively convoluted route over which the coolant is required to travel, as seen by the arrow shown in FIG. 8, should not affect the ability of the coolant movement means 42 to effectively convect the heat generated by the switch modules 66 out of the telecommunications system 26.

Note that the midplane and midplane structure are used interchangeably.

Figure 10:
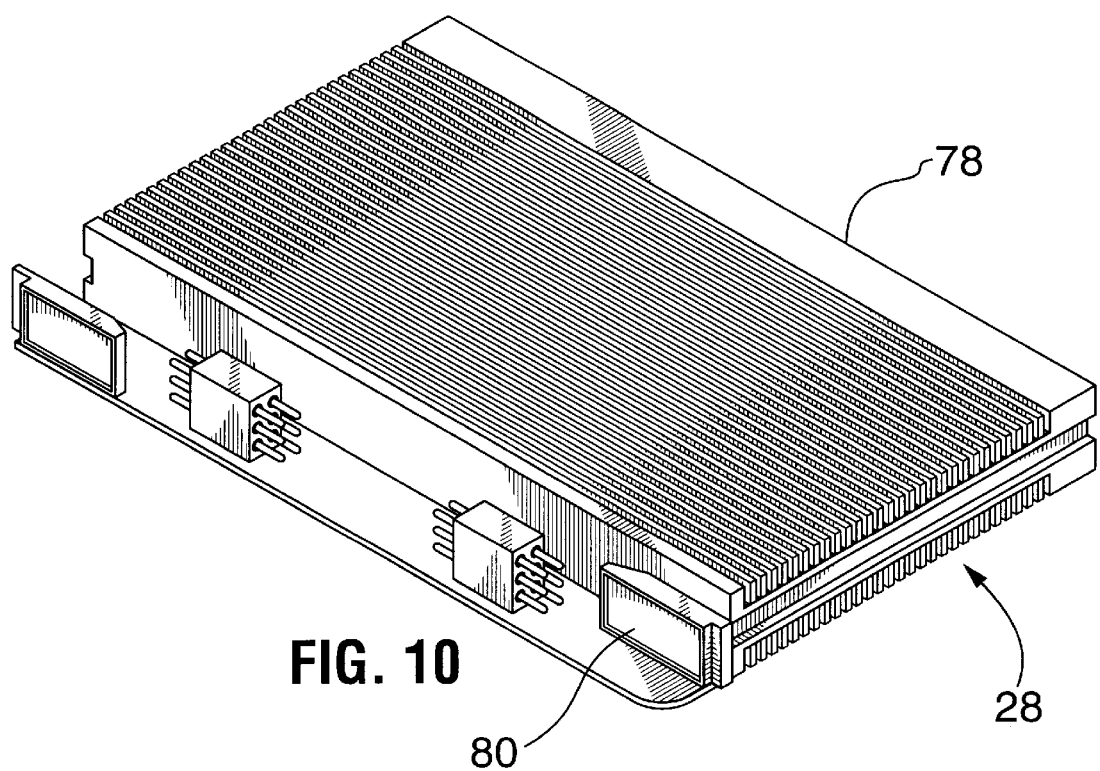
FIG. 10 is a perspective view of a preferred embodiment of an electronics module.

Referring to FIG. 10. in regards to the switch modules 66 and electronics modules 28, while generally shielded in a heat conductive housing 78, it is desirable that they be sealed in such a way that allows for little or no electromagnetic leakage. This can be accomplished but is not limited to utilizing the conductive aluminum housing 78 including the cooling surfaces 36 sealing the electronic components along five sides. The sixth side 80 abutting the midplane 68 on both the switch 66 and electronics modules 28 may be sealed to the midplane 68 around the full perimeter when the module is in place. This may be accomplished but is not limited to utilizing a compressible elastomeric gasket fastened to the midplane.

Finally, while the terminology and embodiments discussed are directed towards telecommunications system, this by no means restricts the scope of the present invention to what are traditionally telecommunications systems in a very narrow sense. The advantage of the module orientation taught in the present invention extends to data processing and digital or data communications industries as well. That is, the teachings enclosed herein, while they refer to a telecommunications system and disclose an embodiment of a novel telecommunications system, are not restricted to the telecommunications industry in a strict sense. The module orientation taught is applicable where groupings of digital signal processing units are arrayed and require heat and data input cabling management as well as inter-processing unit management. As such, data processing units in the telecommunications industry, digital or data communications industry and data processing industries all benefit and are encompassed by the teachings in the present application.

Moreover, the use of the term electronics modules will be understood to include all optical/electronic devices, or data delivery and processing units that generate appreciable heat or utilize significant data input cabling.

In order to provide further assistance, and purely for illustrative purposes, some specifications of one embodiment of the invention are provided below.

Dimensions of the System with Switch Modules and Stack Storage Unit

| Core Bay | |
| --- | --- |
| Width: | 600 mm |
| Height: | 2125 mm |
| Depth: | 600 mm |
| Adjunct Bay | |
| Width: | 600 mm |
| Height: | 2125 mm |
| Depth: | 600 mm |
| Cable Transport | |
| Width: | 300 mm |
| Height: | 2125 mm |
| Depth: | 600 mm |
| Cable Slack Storage Unit | |
| Width: | 450 mm |
| Height: | 2125 mm |
| Depth: | 600 mm |

| Thermal Performance | |
| --- | --- |
| Power Dissipation per module: | 350 W |
| Power Dissipation per Core Bay: | 17,200 W |
| Maximum ambient operating temperature: | 50° C. |
| Maximum module heatsink temperature: | 70° C. |

| Air Mover Performance aud dimensions | |
| --- | --- |
| Diameter: | 225 mm |
| Depth: | 99 mm |
| Air Flow: | 625 CFM at free delivery |

Midplane Traffic 40 high speed controlled impedance signal pairs connected at each of the 128 intersections between the 8 switch modules and the 16 access modules. Each pair is capable of supporting at least 2.5 Gbit/second transmission. This results in a total bi-directional traffic capacity of 6.4 Terabits per second.

Numerous modifications, variations and adaptations may be made to the particular embodiment of the invention described above without departing from the scope of the invention, which is defined in the claims.

What is claimed is:

1. A telecommunications system comprising:
   a. a module rack providing a core bay and defining a service plane and a rack interface plane, wherein the service plane is transverse to the rack interface plane and the core bay is in part bounded by the service plane and the rack interface plane;
   b. a series of electronics modules each defining an electronics orientation plane, each said electronics module including two opposed cooling surfaces oriented substantially parallel to the electronics orientation plane, each said electronics module being removably secured within the core bay, said series of electronics modules forming an array such that their electronics orientation planes are substantially perpendicular to both the rack interface plane and the service plane, the array defining a plurality of coolant stream passages extending across the cooling surfaces defined by said electronics modules, said coolant stream passages being implemented by and between adjacent modules of the array, with said coolant stream passages thus defined being parallel to one another and transverse to the rack interface plane and providing uniform cooling capacity; and
   c. a coolant mover for moving a coolant through the coolant stream passages and across the rack interface plane thus convecting heat away from the cooling surfaces of said electronics modules.

2. A telecommunications system as claimed in claim 1, wherein the electronics orientation planes defined by said electronics modules are substantially horizontal.

3. A telecommunications system as claimed in claim 1, further comprising a means acting as an inlet plenum for the coolant to entry into the coolant stream passages whereby each of said coolant stream passages receives coolant at temperatures substantially equal to each other.

4. A telecommunications system as claimed in claim 2, further comprising a means acting as an inlet plenum for the coolant prior to entry into the coolant stream passages whereby each of said coolant stream passages receives coolant as temperatures substantially equal to each other.

5. A telecommunications system as claimed in claim 1, further comprising a cooling rack defining an adjunct bay in which the coolant mover is supported, the cooling rack and the module rack being in abutting relation adjacent to each other along the interface plane.

6. A telecommunications system as claimed in claim 2, further comprising a cooling rack defining an adjunct bay in which the coolant mover is supported, the cooling rack and the module rack being in abutting relation adjacent to each other along the interface plane.

7. A telecommunications system as claimed in claim 3, further comprising a cooling rack defining an adjunct bay in which the coolant mover is supported, the cooling rack and the module rack being in abutting relation adjacent to each other along the interface plane.

8. A telecommunications system as claimed in claim 1, wherein the coolant mover is at least one air mover.

9. A telecommunications system as claimed in claim 2, wherein the coolant mover is at least one air mover.

10. A telecommunications system as claimed in claims 3, wherein the coolant mover is at least one air mover.

11. A telecommunications system as claimed in claim 5, wherein the coolant mover is at least one air mover.

12. A telecommunications system as defined in claim 1, further comprising a cable transport, said cable transport being in abutting relation to the module rack to define a transport interface plane, said cable transport adapted to direct a series of data carrying cables from the series of electronics modules across the transport interface plane and through said transport to a cable management facility.

13. A telecommunications system as defined in claim 2, further comprising a cable transport, said cable transport being in abutting relation to the module rack to define a transport interface plane, said cable transport adapted to direct a series of data carrying cables from the series of electronics modules across the transport interface plane and through said transport to a cable management facility.

14. A telecommunications system as defined in claim 3, further comprising a cable transport, said cable transport being in abutting relation to the module rack to define a transport interface plane, said cable transport adapted to direct a series of data carrying cables from the series of electronics modules across the transport interface plane and through said transport to a cable management facility.

15. A telecommunications system as defined in claim 5, further comprising a cable transport, said cable transport being in abutting relation to the module rack to define a transport interface plane, said cable transport adapted to direct a series of data carrying cables from the series of electronics modules across the transport interface plane and through said transport to a cable management facility.

16. A telecommunications system as defined in claim 8, further comprising a cable transport, said cable transport being in abutting relation to the module rack to define a transport interface plane, said cable transport adapted to direct a series of data carrying cables from the series of electronics modules across the transport interface plane and through said transport to a cable management facility.

17. A telecommunications system as claimed in claim 12, wherein the transport interface plane is substantially parallel to the rack interface plane.

18. A telecommunications system comprising:
   a. a module rack providing a core bay and defining a service plane and a rack interface plane, wherein the service plane is transverse to the rack interface plane and the core bay is in part bounded by the service plane and the rack interface plane;
   b. a series of electronics modules each defining an electronics orientation plane, each said electronics module including two opposed cooling surfaces oriented substantially parallel to the electronics orientation plane, each said electronics module being removably secured within the core bay, said series of electronics modules forming an array such that their electronics orientation planes are substantially perpendicular to both the rack interface plane and the service plane, the array defining a plurality of coolant stream passages extending across the cooling surfaces defined by said electronics modules, with said coolant stream passages thus defined being parallel to one another and transverse to the rack interface plane;
   c. a coolant mover for moving a coolant through the coolant stream passages and across the rack interface plane thus convecting heat away from the cooling surfaces of said electronics modules; and
   d. a cable transport, said cable transport being in abutting relation to the module rack to define a transport interface plane, said cable transport adapted to direct a series of data carrying cables from the series of electronics modules across the transport interface plane and through said transport to a cable management facility;
   wherein the cable transport also acts as a plenum for the coolant prior to entry into the coolant stream passages.

19. A telecommunications system comprising:
a. a module rack providing a core bay and defining a service plane and a rack interface plane, wherein the service plane is transverse to the rack interface plane and the core bay is in part bounded by the service plane and the rack interface plane;
b. a series of electronics modules each defining an electronics orientation plane, each said electronics module including two opposed cooling surfaces oriented substantially parallel to the electronics orientation plane, each said electronics module being removably secured within the core bay, said series of electronics modules forming an array such that their electronics orientation planes are substantially perpendicular to both the rack interface plane and the service plane, the array defining a plurality of coolant stream passages extending across the cooling surfaces defined by said electronics modules, with said coolant stream passages thus defined being parallel to one another and transverse to the rack interface plane;
c. a coolant mover for moving a coolant through the coolant stream passages and across the rack interface plane thus convecting heat away from the cooling surfaces of said electronics modules; and
d. a cable transport, said cable transport being in abutting relation to the module rack to define a transport interface plane, said cable transport adapted to direct a series of data carrying cables from the series of electronics modules across the transport interface plane and through said transport to a cable management facility;
wherein the transport interface plane is substantially parallel to the rack interface plane and the cable transport also acts as a plenum for the coolant prior to entry into the coolant stream passages.

20. A telecommunications system comprising:
a. a module rack providing a core bay and defining a service plane and a rack interface plane, wherein the service plane is transverse to the rack interface plane and the core bay is in part bounded by the service plane and the rack interface plane;
b. a series of electronics modules each defining an electronics orientation plane, each said electronics module including two opposed cooling surfaces oriented substantially parallel to the electronics orientation plane, each said electronics module being removably secured within the core bay, said series of electronics modules forming an array such that their electronics orientation planes are substantially perpendicular to both the rack interface plane and the service plane, the array defining a plurality of coolant stream passages extending across the cooling surfaces defined by said electronics modules, with said coolant stream passages thus defined being parallel to one another and transverse to the rack interface plane;
c. a coolant mover for moving a coolant through the coolant stream passages and across the rack interface plane thus convecting heat away from the cooling surfaces of said electronics modules;
d. a midplane structure defining a frontal and rear face, the mid plane structure being secured in the core bay such that the frontal face is oriented toward and is substantially parallel to the service plane; and
e. at least one switch module defining a switch orientation plane, said switch module being secured within the core bay such that the switch orientation plane is transverse to the electronics orientation planes defined by said electronics modules and parallel to the interface plane, said at least one switch module being in communication through the rear face of the midplane structure with a plurality of said electronics modules.

21. A telecommunications system as defined in claim 12, further comprising a cable transport, said cable transport being in abutting relation to the module rack to define a transport interface plane, said cable transport adapted to direct a series of data carrying cables from the series of electronics modules across the transport interface plane and through said transport to a cable management facility.

22. A telecommunications system as defined in claim 20, further comprising:
a. a slack storage unit defining a rack surface and a transport surface, said slack storage unit including a series of rows corresponding to each of said electronics modules, said series of rows extending from said rack surface to said transport surface; and,
b. a cable transport, said rack surface being in abutting relation with the module rack to define a storage interface plane and said transport surface being in abutting relation with the cable transport to define a storage transport interface plane, said slack storage unit adapted to direct a series of data carrying cables from the series electronics modules across the transport interface through one of said series of rows across the storage transport interface plane and through the cable transport to a cable management facility.

23. A telecommunications system comprising:
a. a module rack providing a core bay and defining a service plane and a rack interface plane, wherein the service plane is transverse to the rack interface plane and the core bay is in part bounded by the service plane and the rack interface plane;
b. a series of electronics modules each defining an electronics orientation plane, each said electronics module including two opposed cooling surfaces oriented substantially parallel to the electronics orientation plane, each said electronics module being removably secured within the core bay, said series of electronics modules forming an array such that their electronics orientation planes are substantially perpendicular to both the rack interface plane and the service plane, the array defining a plurality of coolant stream passages extending across the cooling surfaces defined by said electronics modules, with said coolant stream passages thus defined being parallel to one another and transverse to the rack interface plane;
c. a coolant mover for moving a coolant through the coolant stream passages and across the rack interface plane thus convecting heat away from the cooling surfaces of said electronics modules;
d. a midplane structure defining a frontal and rear face, the midplane structure being secured in the core bay such that the frontal face is oriented toward and is substantially parallel to the service plane; and
e. at least one switch module defining a switch orientation plane, said switch module being secured within the core bay such that the switch orientation plane is transverse to the electronics orientation planes defined by said electronics modules and parallel to the interface plane, said at least one switch module being in communication through the rear face of the midplane structure with a plurality of said electronics modules,
wherein the electronics orientation planes defined by said electronics modules are substantially horizontal.

24. A telecommunications system comprising:
a. a module rack providing a core bay and defining a service plane and a rack interface plane, wherein the service plane is transverse to the rack interface plane and the core bay is in part bounded by the service plane and the rack interface plane;
b. a series of electronics modules each defining an electronics orientation plane, each said electronics module including two opposed cooling surfaces oriented substantially parallel to the electronics orientation plane, each said electronics module being removably secured within the core bay, said series of electronics modules forming an array such that their electronics orientation planes are substantially perpendicular to both the rack interface plane and the service plane, the array defining a plurality of coolant stream passages extending across the cooling surfaces defined by said electronics modules, with said coolant stream passages thus defined being parallel to one another and transverse to the rack interface plane;
c. a coolant mover for moving a coolant through the coolant stream passages and across the rack interface plane thus convecting heat away from the cooling surfaces of said electronics modules;
d. a means acting as an inlet plenum for the coolant prior to entry into the coolant stream passages whereby each of said coolant stream passages receives coolant at temperatures substantially equal to each other;
e. a midplane structure defining a frontal and rear face, the mid plane structure being secured in the core bay such that the frontal face is oriented toward and is substantially parallel to the service plane; and
f. at least one switch module defining a switch orientation plane, said switch module being secured within the core bay such that the switch orientation plane is transverse to the electronics orientation planes defined by said electronics modules and parallel to the interface plane, said at least one switch module being in communication through the rear face of the midplane structure with a plurality of said electronics modules.

25. A telecommunications system comprising:
a. a module rack providing a core bay and defining a service plane and a rack interface plane, wherein the service plane is transverse to the rack interface plane and the core bay is in part bounded by the service plane and the rack interface plane;
b. a series of electronics modules each defining an electronics orientation plane, each said electronics module including two opposed cooling surfaces oriented substantially parallel to the electronics orientation plane, each said electronics module being removably secured within the core bay, said series of electronics modules forming an array such that their electronics orientation planes are substantially perpendicular to both the rack interface plane and the service plane, the array defining a plurality of coolant stream passages extending across the cooling surfaces defined by said electronics modules, with said coolant stream passages thus defined being parallel to one another and transverse to the rack interface plane;
c. a coolant mover for moving a coolant through the coolant stream passages and across the rack interface plane thus convecting heat away from the cooling surfaces of said electronics modules;
d. a cooling rack defining an adjunct bay in which the coolant mover is supported, the cooling rack and the module rack being in abutting relation adjacent to each other along the interface plane;
e. a midplane structure defining a frontal and rear face, the midplane structure being secured in the core bay such that the frontal face is oriented toward and is substantially parallel to the service plane; and
f. at least one switch module defining a switch orientation plane, said switch module being secured within the core bay such that the switch orientation plane is transverse to the electronics orientation planes defined by said electronics modules and parallel to the interface plane, said at least one switch module being in communication through the rear face of the midplane structure with a plurality of said electronics modules.

26. A telecommunications system comprising:
a. a module rack providing a core bay and defining a service plane and a rack interface plane, wherein the service plane is transverse to the rack interface plane and the core bay is in part bounded by the service plane and the rack interface plane;
b. a series of electronics modules each defining an electronics orientation plane, each said electronics module including two opposed cooling surfaces oriented substantially parallel to the electronics orientation plane, each said electronics module being removably secured within the core bay, said series of electronics modules forming an array such that their electronics orientation planes are substantially perpendicular to both the rack interface plane and the service plane, the array defining a plurality of coolant stream passages extending across the cooling surfaces defined by said electronics modules, with said coolant stream passages thus defined being parallel to one another and transverse to the rack interface plane;
c. a coolant mover for moving a coolant through the coolant stream passages and across the rack interface plane thus convecting heat away from the cooling surfaces of said electronics modules;
d. a midplane structure defining a frontal and rear face, the midplane structure being secured in the core bay such that the frontal face is oriented toward and is substantially parallel to the service plane; and
e. at least one switch module defining a switch orientation plane, said switch module being secured within the core bay such that the switch orientation plane is transverse to the electronics orientation planes defined by said electronics modules and parallel to the interface plane, said at least one switch module being in communication through the rear face of the midplane structure with a plurality of said electronics modules, wherein the coolant mover is at least one air mover.

27. A telecommunications system comprising:
a. a module rack providing a core bay and defining a service plane and a rack interface plane, wherein the service plane is transverse to the rack interface plane and the core bay is in part bounded by the service plane and the rack interface plane;
b. a series of electronics modules each defining an electronics orientation plane, each said electronics module including two opposed cooling surfaces oriented substantially parallel to the electronics orientation plane, each said electronics module being removably secured within the core bay, said series of electronics modules forming an array such that their electronics orientation planes are substantially perpendicular to both the rack interface plane and the service plane, the array defining a plurality of coolant stream passages extending across the cooling surfaces defined by said electronics modules, with said coolant stream passages thus defined being parallel to one another and transverse to the rack interface plane;

c. a coolant mover for moving a coolant through the coolant stream passages and across the rack interface plane thus convecting heat away from the cooling surfaces of said electronics modules;

d. a slack storage unit defining a rack surface and a transport surface, said slack storage unit including a series of rows corresponding to each of said electronics modules, said series of rows extending from said rack surface to said transport surface; and e. a cable transport, said rack surface being in abutting relation with the module rack to define a storage interface plane and said transport surface being in abutting relation with the cable transport to define a storage transport interface plane, said slack storage unit adapted to direct a series of data carrying cables from the series electronics modules across the transport interface through one of said series of rows across the storage transport interface plane and through the cable transport to a cable management facility.

28. A telecommunications system as claimed in claim 27, wherein the storage interface plane is substantially parallel to the rack interface plane.

29. A telecommunications system as claimed in claim 28, wherein the transport interface plane is substantially parallel to the rack interface plane.

30. A telecommunications system as claimed in claim 29, wherein the cable transport also acts as a plenum for the coolant prior to entry into the coolant stream passages.

31. A telecommunications system as claimed in claim 29, wherein the slack storage unit also acts as a plenum for the coolant prior to entry into the coolant stream passages.

32. A telecommunications system as claimed in claim 28, wherein the slack storage unit also acts as a plenum for the coolant prior to entry into the coolant stream passages.

33. A telecommunications system comprising:

a. a module rack providing a core bay and defining a service plane and a rack interface plane, wherein the service plane is transverse to the rack interface plane and the core bay is in part bounded by the service plane and the rack interface plane;

b. a series of electronics modules each defining an electronics orientation plane, each said electronics module including two opposed cooling surfaces oriented substantially parallel to the electronics orientation plane, each said electronics module being removably secured within the core bay, said series of electronics modules forming an array such that their electronics orientation planes are substantially perpendicular to both the rack interface plane and the service plane, the array defining a plurality of coolant stream passages extending across the cooling surfaces defined by said electronics modules, with said coolant stream passages thus defined being parallel to one another and transverse to the rack interface plane;

c. a coolant mover for moving a coolant through the coolant stream passages and across the rack interface plane thus convecting heat away from the cooling surfaces of said electronics modules;

d. a slack storage unit defining a rack surface and a transport surface, said slack storage unit including a series of rows corresponding to each of said electronics modules, said series of rows extending from said rack surface to said transport surface; and e. a cable transport, said rack surface being in abutting relation with the module rack to define a storage interface plane and said transport surface being in abutting relation with the cable transport to define a storage transport interface plane, said slack storage unit adapted to direct a series of data carrying cables from the series electronics modules across the transport interface through one of said series of rows across the storage transport interface plane and through the cable transport to a cable management facility, wherein the electronics orientation planes defined by said electronics modules are substantially horizontal.

34. A telecommunications system comprising:

a. a module rack providing a core bay and defining a service plane and a rack interface plane, wherein the service plane is transverse to the rack interface plane and the core bay is in part bounded by the service plane and the rack interface plane;

b. a series of electronics modules each defining an electronics orientation plane, each said electronics module including two opposed cooling surfaces oriented substantially parallel to the electronics orientation plane, each said electronics module being removably secured within the core bay, said series of electronics modules forming an array such that their electronics orientation planes are substantially perpendicular to both the rack interface plane and the service plane, the array defining a plurality of coolant stream passages extending across the cooling surfaces defined by said electronics modules, with said coolant stream passages thus defined being parallel to one another and transverse to the rack interface plane;

c. a coolant mover for moving a coolant through the coolant stream passages and across the rack interface plane thus convecting heat away from the cooling surfaces of said electronics modules;

d. a means acting as an inlet plenum for the coolant prior to entry into the coolant stream passages whereby each of said coolant stream passages receives coolant at temperatures substantially equal to each other;

e. a slack storage unit defining a rack surface and a transport surface, said slack storage unit including a series of rows corresponding to each of said electronics modules, said series of rows extending from said rack surface to said transport surface; and f. a cable transport, said rack surface being in abutting relation with the module rack to define a storage interface plane and said transport surface being in abutting relation with the cable transport to define a storage transport interface plane, said slack storage unit adapted to direct a series of data carrying cables from the series electronics modules across the transport interface through one of said series of rows across the storage transport interface plane and through the cable transport to a cable management facility.

35. A telecommunications system comprising:

a. a module rack providing a core bay and defining a service plane and a rack interface plane, wherein the service plane is transverse to the rack interface plane and the core bay is in part bounded by the service plane and the rack interface plane;

b. a series of electronics modules each defining an electronics orientation plane, each said electronics module including two opposed cooling surfaces oriented substantially parallel to the electronics orientation plane, each said electronics module being removably secured within the core bay, said series of electronics modules forming an array such that their electronics orientation planes are substantially perpendicular to both the rack interface plane and the service plane, the array defining a plurality of coolant stream passages extending across the cooling surfaces defined by said electronics modules, with said coolant stream passages thus defined being parallel to one another and transverse to the rack interface plane;

c. a coolant mover for moving a coolant through the coolant stream passages and across the rack interface plane thus convecting heat away from the cooling surfaces of said electronics modules;

d. a cooling rack defining an adjunct bay in which the coolant mover is supported, the cooling rack and the module rack being in abutting relation adjacent to each other along the interface plane;

e. a slack storage unit defining a rack surface and a transport surface, said slack storage unit including a series of rows corresponding to each of said electronics modules, said series of rows extending from said rack surface to said transport surface; and f. a cable transport, said rack surface being in abutting relation with the module rack to define a storage interface plane and said transport surface being in abutting relation with the cable transport to define a storage transport interface plane, said slack storage unit adapted to direct a series of data carrying cables from the series electronics modules across the transport interface through one of said series of rows across the storage transport interface plane and through the cable transport to a cable management facility.

36. A telecommunications system comprising:

a. a module rack providing a core bay and defining a service plane and a rack interface plane, wherein the service plane is transverse to the rack interface plane and the core bay is in part bounded by the service plane and the rack interface plane;

b. a series of electronics modules each defining an electronics orientation plane, each said electronics module including two opposed cooling surfaces oriented substantially parallel to the electronics orientation plane, each said electronics module being removably secured within the core bay, said series of electronics modules forming an array such that their electronics orientation planes are substantially perpendicular to both the rack interface plane and the service plane, the array defining a plurality of coolant stream passages extending across the cooling surfaces defined by said electronics modules, with said coolant stream passages thus defined being parallel to one another and transverse to the rack interface plane;

c. a coolant mover for moving a coolant through the coolant stream passages and across the rack interface plane thus convecting heat away from the cooling surfaces of said electronics modules;

d. a slack storage unit defining a rack surface and a transport surface, said slack storage unit including a series of rows corresponding to each of said electronics modules, said series of rows extending from said rack surface to said transport surface; and e. a cable transport, said rack surface being in abutting relation with the module rack to define a storage interface plane and said transport surface being in abutting relation with the cable transport to define a storage transport interface plane, said slack storage unit adapted to direct a series of data carrying cables from the series electronics modules across the transport interface through one of said series of rows across the storage transport interface plane and through the cable transport to a cable management facility, wherein the coolant mover is at least one air mover.

37. A telecommunications system comprising:

a. a module rack providing a core bay and defining a service plane and a rack interface plane, wherein the service plane is transverse to the rack interface plane and the core bay is in part bounded by the service plane and the rack interface plane;

b. a series of electronics modules each defining an electronics orientation plane, each said electronics module including two opposed cooling surfaces oriented substantially parallel to the electronics orientation plane, each said electronics module being removably secured within the core bay, said series of electronics modules forming an array such that their electronics orientation planes are substantially perpendicular to both the rack interface plane and the service plane, the array defining a plurality of coolant stream passages extending across the cooling surfaces defined by said electronics modules, with said coolant stream passages thus defined being parallel to one another and transverse to the rack interface plane;

c. a coolant mover for moving a coolant through the coolant stream passages and across the rack interface plane thus convecting heat away from the cooling surfaces of said electronics modules; and d. a cable transport, said cable transport being in abutting relation to the module rack to define a transport interface plane, said cable transport adapted to direct a series of data carrying cables from the series of electronics modules across the transport interface plane and through said transport to a cable management facility;

wherein the cable transport defines a series of channels for directing the series of fibre-optic cables, where each channel corresponds to each electronics module and directs fibre-optic cables from said electronics module.

38. A telecommunications system as claimed in claim 37, wherein the transport interface plane is substantially parallel to the rack interface plane.

39. A telecommunications system as claimed in claim 37, wherein the cable transport also acts as a plenum for the coolant prior to entry into the coolant stream passages.

* * * * *